March 27, 1956 H. M. McCALL 2,739,368
APPARATUS FOR CLEANING PIPE INTERIORS
Filed Nov. 25, 1953
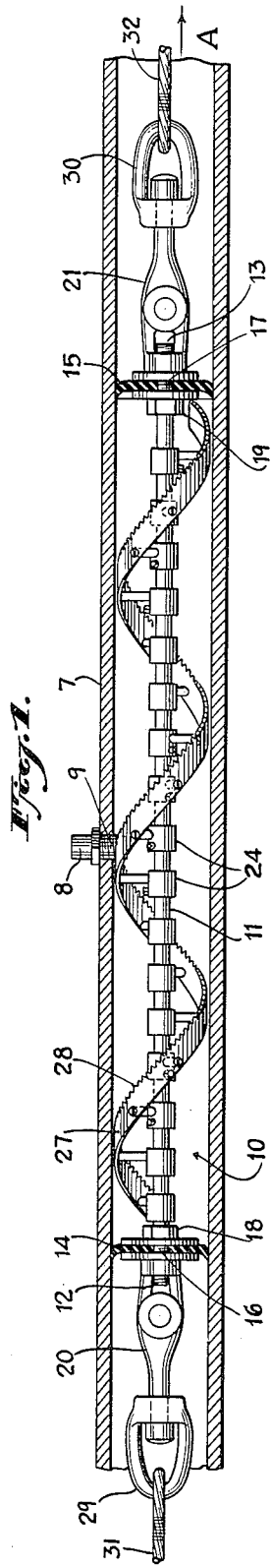
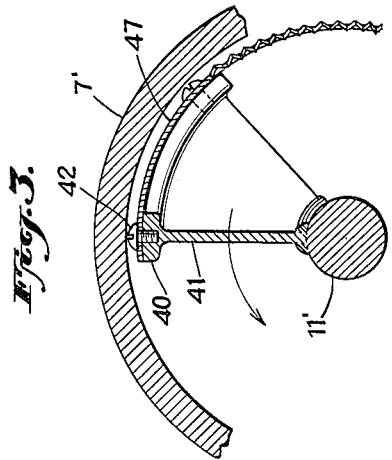
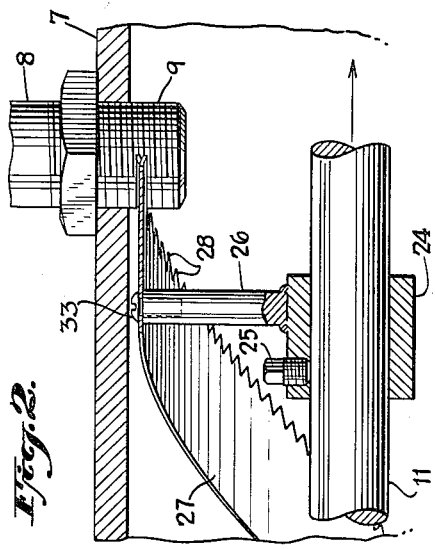
INVENTOR.
HAROLD M. McCALL.
BY
Ward, Crosby & Neal
ATTORNEYS.

United States Patent Office 2,739,368
Patented Mar. 27, 1956

2,739,368
APPARATUS FOR CLEANING PIPE INTERIORS

Harold M. McCall, Fairlawn, N. J., assignor to Centriline Corporation, New York, N. Y., a corporation Application November 25, 1953, Serial No. 394,310

1 Claim. (Cl. 29—67)

This invention relates to improvements in the art of coating and lining the interior of pipes and other conduits, but more particularly to a novel apparatus for removing obstructions from the interior surface of the pipe to prepare same for lining or coating.

Various well-known methods of lining the interior of pipes and conduits are now being employed. In all of these methods, prior to the actual application of the lining or coating, it is necessary to clean the interior pipe surface, and to cut off protrusions extending into the pipe, such as small inwardly protruding portions of outlet pipes which would obstruct the passage of the lining tool. Several types of scraping tools are available to clean the interior of the pipe surface. Such scraping tools, however, act to remove protrusions by bending, breaking or scraping action which results in damage to the pipes or to the protrusions themselves and in many instances such a scraper merely distorts the protrusions without actually removing them.

The object of the present invention is to provide a simple, rapid and economical apparatus for cutting off protrusions, which extend into a pipe, flush with the pipe wall, without consequent damage to the pipe or to the remaining parts of the protrusions themselves. Another object of this invention is to accomplish this result in a manner which is practicable for use under field operating conditions and does not require any power other than the ordinary winch and cable used to pull the lining tool through the pipe.

More specifically, the present invention contemplates a cutting tool comprised of a central member having flexible means at each end thereof, with a helical saw disposed around the member and between the flexible means. These flexible means are specifically designed of sufficient size so as to insure frictional contact between the tool and the interior of the pipe which is to be cleaned. The cutting tool is adapted to be pulled through a pipe while the latter remains in situ underground, and during such travel through the pipe the helical saw contacts any protrusions therein. Upon contact with such a protrusion, free rotation of the saw is prevented by virtue of the frictional grip between the flexible means and the interior of the pipe. Therefore, continued forward motion of the cutting tool results in gradual rotation thereof but since free rotation is restrained, the saw, as it advances, applies adequate pressure against the protrusion, thereby causing the same to be sawed off.

Further objects, features and advantages of the invention hereof will appear from the detailed description given below, taken in connection with the accompanying drawings which form a part of this specification and illustrate by way of example, preferred embodiments of the invention.

In the drawings:

Fig. 1 is a longitudinal sectional view of the cutting tool of the invention operatively disposed in a length of pipe;

Fig. 2 is an enlarged, fragmentary longitudinal sectional view showing the cutting tool of Fig. 1 sawing off a protrusion in the pipe; and Fig. 3 is an enlarged, fragmentary cross-sectional view of a modified embodiment of the cutting tool of the invention.

Referring now in more detail to the drawings and in particular to Fig. 1, a pipe 7 is shown having a branch line 8 threadedly connected thereto. As will be seen more clearly in Fig. 2, the threaded end 9 of this branch line 8 extends into the interior of the pipe 7 and constitutes an internal protrusion therein.

The invention contemplates a cutting tool 10 which is designed to remove this protrusion 9 within the interior of pipe 7 as well as other protrusions in other conduits of similar size. This cutting tool 10 comprises a central rod 11 screw threaded at its end 12 and 13. Circular discs 14 and 15, having central apertures 16 and 17 adapted to accommodate these screw threaded ends of the rod, are secured on the rod at right angles to its axis near the ends thereof by means of nuts 18, 19 and swivel members 20, 21 threaded on the rod. The diameter of these discs is determined by the size of pipe which is to be cleaned and is designed so as to provide a good frictional grip between these discs and the interior of the pipe.

The discs 14 and 15 are flexible, being formed of rubber or similar material, and are restrained from axial movement along the axis of rod 11 by means of the nuts and swivel members. A plurality of sleeves 24 are spaced axially along the rod 11 between discs 14 and 15 and are secured to the rod by means of set screws 25. Extending radially from each of these sleeves is a post 26, and each succeeding post is circumferentially offset from the preceding one with respect to the rod, the posts thereby being spirally disposed around the rod 11. A helical saw 27, having generally tangentially extending saw teeth 28, is disposed around the rod 11, with its teeth 28 directed generally tangentially to the interior surface of the pipe 7. The saw is secured to each post 26 by suitable fastening means 33. The posts 26 are all of uniform length, and thus serve to space the saw equidistant from the rod 11 at all points. This length of the posts of course depends upon the internal diameter of the pipe in which the cutting tool is to be used, and for any given size pipe the post length is such as to maintain the cutting edge of the saw quite close to the internal surface of the pipe and yet provide sufficient clearance therebetween for passage of the tool. Terminal eyes 29 and 30 are rotatably mounted on the swivel members 20 and 21 so as to permit the attachment thereto of cables 31 and 32, the latter in turn being connected to a winch (not shown) which is normally provided to pull the cutting tool through the pipe.

In Fig. 3 there is shown an alternative means for supporting a helical saw 47 from the central rod 11' of the cutting tool. There, in place of the sleeves 24 and posts 26, a ribbon 40 is helically disposed about the rod and secured thereto by means of a helical web 41, which is welded to the rod. The helical saw 47 is fastened to the ribbon by means of screws 42. The remaining structure of this modification is identical to that disclosed and described in connection with Fig. 1.

In operation the cutting tool 10 is held centered in the pipe 7 by means of the discs 14 and 15. As described above these flexible discs 14 and 15 have a diameter which is sufficient to provide frictional contact between the discs and the internal surface of the pipe 7. As is indicated by the direction of arrow A in Fig. 1, the cutting tool 10 there is being pulled from left to right through the pipe by means of power supplied from the winch through cable 32. Assuming that the tool has just entered the pipe at the left hand side of Fig. 1 and is being gradually pulled to the right, the disc 15 will of course strike protrusion 9. However, since this disc 15 is flexible it will bend to the left and pass under the protrusion thereby permitting continued forward motion of the cutting tool and soon the position shown in Fig. 1 is reached where the cutting edge of the helical saw has contacted and started to saw off the protrusion 9. Contact between this protrusion and the helical saw, of course, imparts rotary motion to the cutting tool 10 as the latter continues to move forward in the pipe. Since the discs 14 and 15 frictionally engage the internal wall of the pipe the helical saw is prevented from freely rotating in the pipe, and instead gradually rotates as it moves forward so that continued pulling of the saw from left to right will saw the protrusion 9 off substantially flush with the internal pipe surface. The disc 14 will then act to push the sawed off end along in the pipe to an accessible point for removal.

It should be observed that it may be desirable to form the central rod of the cutting tool of a somewhat flexible material so as to permit the tool to maneuver past any turns in the pipe which is to be cleaned.

Although certain particular embodiments of the invention are herein disclosed for purposes of explanation, various further modifications thereof, after study of this specification, will be apparent to those skilled in the art to which the invention pertains. Reference should accordingly be had to the appended claim in determining the scope of the invention.

What is claimed and desired to be secured by Letters Patent is:

A tool adapted to be drawn through pipe for sawing off inwardly protruding portions of nipples and the like in the pipe, comprising: an elongated saw blade of helical shape and adapted substantially to conform to the cylindrical interior wall surface of the pipe and formed with several convolutions, said convolutions being of ribbon-like cross-section and having numerous saw teeth along at least one edge; means extending along within the tool for normally supporting and holding said convolutions in widely spaced relation longitudinally of the tool and in position substantially to conform to the cylindrical interior wall surface of the pipe; and a flexible disc at one end at least of the tool for supporting the saw blade in concentric relation to the pipe, while permitting the tool to rotate about its axis as the saw teeth engage and saw off a protrusion.

References Cited in the file of this patent

UNITED STATES PATENTS

| 62,816 | Christoffel | Mar. 12, 1867 |
| 423,128 | Christoffel | Mar. 11, 1890 |
| 498,659 | Johnston | May 30, 1893 |
| 1,611,820 | Delo | Dec. 21, 1926 |
| 1,777,064 | Wright | Sept. 30, 1930 |